United States Patent [19]
Sulzberger et al.

[11] Patent Number: 5,631,422
[45] Date of Patent: May 20, 1997

[54] SENSOR COMPRISING MULTILAYER SUBSTRATE

[75] Inventors: Peter Sulzberger, Treuchtlingen; Michael Offenberg, Tuebingen; Bernhard Elsner, Kornwestheim; Markus Lutz, Reutlingen, all of Germany

[73] Assignee: Robert Bosch GmbH, Stuttgart, Germany

[21] Appl. No.: 550,484

[22] Filed: Oct. 30, 1995

[30] Foreign Application Priority Data

Feb. 2, 1995 [DE] Germany .................. 195 03 236.5

[51] Int. Cl.⁶ .................... G01P 15/125; H01G 7/00
[52] U.S. Cl. ..................... 73/514.32; 361/283.3
[58] Field of Search ................. 73/514.32, 514.36; 361/280, 283.3; 437/228

[56] References Cited

U.S. PATENT DOCUMENTS

| | | | |
|---|---|---|---|
| 5,337,606 | 8/1994 | Bennett et al. | 73/514.32 |
| 5,345,824 | 9/1994 | Sherman et al. | 73/514.32 |
| 5,417,111 | 5/1995 | Sherman et al. | 73/514.32 |
| 5,495,761 | 3/1996 | Diem et al. | 73/514.32 |

FOREIGN PATENT DOCUMENTS

4419844A1  12/1995  Germany .

Primary Examiner—Hezron E. Williams
Assistant Examiner—Richard A. Moller
Attorney, Agent, or Firm—Kenyon & Kenyon

[57] ABSTRACT

A sensor includes a first silicon layer, and a sensor element including at least one electrode structured from the first silicon layer. The sensor also includes at least one connecting element also structured from the first silicon layer. The connecting element has a doping less than the doping of the electrode. The sensor comprises at least one conductor track on the first silicon layer routed over the connecting element and coupled to the sensor element for supplying an external signal.

10 Claims, 1 Drawing Sheet

SENSOR COMPRISING MULTILAYER SUBSTRATE

BACKGROUND INFORMATION

German Patent Application No. 44 19 844 describes a sensor comprising a multilayer substrate, in which there is provided a top silicon layer from which electrodes are structured. Furthermore, conductor tracks for making electrical contact with the electrodes are provided on the top of the first silicon layer. The electrodes are insulated from the rest of the first silicon layer by trenches which are filled with insulating material. The metallic conductor tracks are routed over these trenches.

SUMMARY OF THE INVENTION

The sensor according to the present invention has the advantage that it is possible to make high-quality contact with the electrodes. At the same time, parasitic effects or leakage currents are kept low. Furthermore, the sensor according to the present invention can be produced using simple methods of semiconductor technology. Use may also be made here of processes in which no buried layers at all are provided, such as CMOS processes, for instance.

The described structure can be used particularly favorably as an acceleration sensor. Nonlinearities in the transfer function can be reduced by a differential capacitor arrangement. The sensor according to the present invention is realized with particular ease on a monocrystalline silicon substrate. In this case, the actual sensor structure can be produced from a polysilicon layer. The use of a top silicon layer which partly comprises monocrystalline silicon means that this can also be used for the production of circuits.

DETAILED DESCRIPTION

Figure 1:
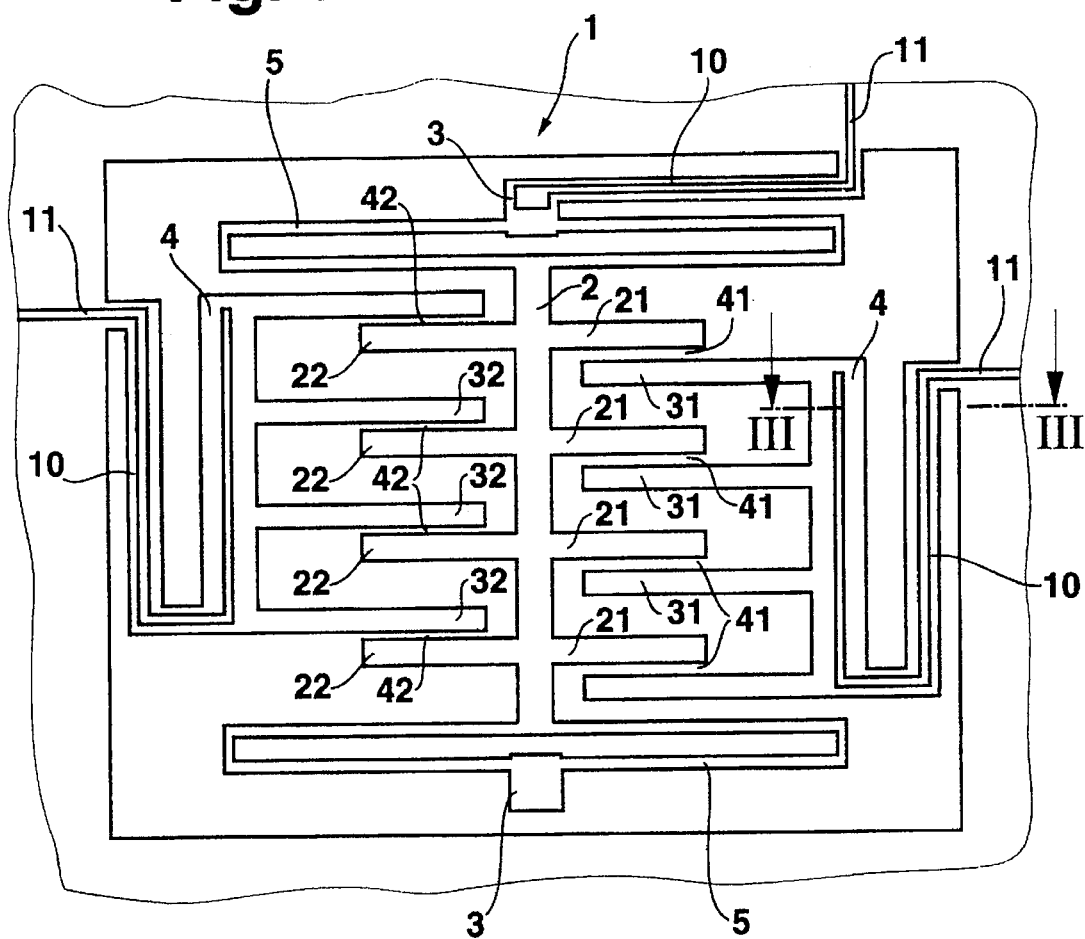
FIG. 1 shows a plan view of the sensor according to the present invention.

FIG. 1 shows a plan view of a sensor 1 according to the present invention. The sensor has a movable element which is formed by the spring elements 5, the central bar 2 and the movable electrodes 21, 22. The movable element is displaced from its starting position by an acceleration along the longitudinal axis of the central bar 2. Sensors having movable elements of this type are described in German Patent Application No. 44 19 844 and are used as acceleration sensors. The spring elements 5 are fastened to bearing blocks 3. The sensor further has stationary electrodes 31, 32, which are suspended from bearing bars 4.

Figure 3:
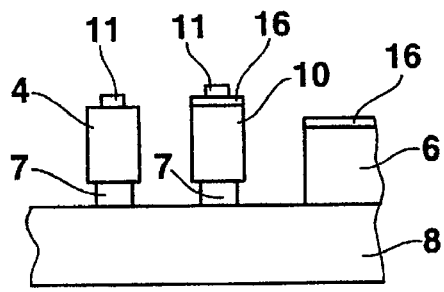
FIG. 3 shows a cross section through the sensor according to FIG. 1 along the line III—III.

FIG. 3 shows a cross section through the sensor according to FIG. 1 along the line III—III. As is evident in FIG. 3, the sensor is formed from a multilayer board. The lower layer of the multilayer board comprises a substrate layer 8. A first silicon layer 6 is provided on the substrate layer 8. The individual elements of the sensor are essentially structured from this layer 6.

The spring elements 5, the central bar 2 and the movable electrodes 21, 22 are structured from the first silicon layer 6 and have a spacing from the substrate layer 8. These elements are therefore movable relative to the substrate layer 8. The spring elements 5 are fastened to the bearing blocks 3. These bearing blocks 3 are connected to the substrate layer 8 by a dielectric layer 7. Consequently, the bearing blocks 3 are permanently anchored on the substrate layer 8. Furthermore, the bearing bars 4 are connected to the substrate layer 8 by the dielectric layer 7. Consequently, the bearing bars 4 are also permanently anchored on the substrate layer 8.

The stationary electrodes 31, 32 are suspended from the bearing bars 4. The geometric dimensions of the stationary electrodes 31, 32 are selected in such a way that they are displaced only to an insignificant extent in the event of accelerations. In contrast, the spring elements 5 are constructed such that an acceleration along the longitudinal axis of the central bar 2 effects a deformation of the spring elements 5. This leads to a change in the distance of the movable electrodes 21, 22 from the stationary electrodes 31, 32. This Change in the distance between the electrodes can be detected by measuring the capacitance between the movable electrodes 21, 22 and the stationary electrodes 31, 32. Therefore, the sensor according to FIG. 1 can be used as a capacitive acceleration sensor.

In order to make contact with the electrodes, conductor tracks 11 (electrical supply lines) are provided, by means of which the bearing blocks 3 and bearing bars 4 are made contact with. This type of contact-making is particularly advantageous if an evaluation circuit for the sensor is provided in the top silicon layer 6. A direct connection can then be established between the sensor 1 and the evaluation circuit by means of the conductor tracks 11. Since the layer thickness of the first silicon layer 6 is large in relation to the conductor track thickness and the structured elements have vertical edges, connecting elements 10 are provided, which are arranged between the bearing bar 4 or the bearing block 3 and the rest of the silicon layer 6. The conductor tracks are routed over these connecting elements 10, with the result that the conductor tracks have to surmount only small differences in height.

The bearing blocks 3, the bearing bars 4, the spring elements 5, the central bar 2 and the electrodes 21, 22, 31, 32 are highly doped. This high doping ensures that the electrodes act as capacitor plates and, thus, the capacitances between the electrodes can be measured. The connecting elements 10 are weakly doped. This measure ensures that the sensor is insulated from the silicon layer 6. This measure further ensures that the movable electrodes 21, 22 are insulated from the stationary electrodes 31, 32 and that the individual groups of stationary electrodes 31, 32 are mutually insulated.

The method of producing the sensor is explained with reference to FIGS. 2 and 3. A dielectric layer 7 and a first silicon layer 6 are applied to a substrate layer 8. In this case, the substrate layer 8 is intended to take the form of a silicon wafer, since the further layers can be applied thereto without any problems. Moreover, the use of a silicon wafer for the substrate layer 8 allows the first silicon layer to be designed in such a way that circuits can be incorporated into the first silicon layer 6. The dielectric layer 7 is intended to take the form of the customary dielectric materials known from semiconductor manufacture, such as silicon oxide, silicon nitride, or different glass layers. It is assumed in the further description that the material for the dielectric layer 7 is silicon oxide.

Figure 2:
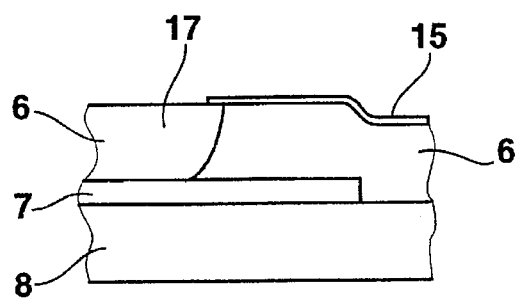
FIG. 2 shows a cross section through a multilayer substrate during the production of the sensor.

As is shown in FIG. 2, it is possible for the dielectric layer 7 to be arranged only underneath the sensor structure. As an alternative, it is also possible for the dielectric layer 7 to extend completely between the first silicon layer 6 and the substrate layer 8. If the dielectric layer 7 is structured, the first silicon layer 6 is expediently applied by means of a deposition process. To this end, a polysilicon layer having a thickness of a few μm can be applied, for example. The first silicon layer 6 then contains entirely polysilicon. If it is desired to form circuits, they must be formed in the substrate layer 8, which then contains monocrystalline silicon.

Another possible option is to use a process which is known from semiconductor production for depositing epitaxial layers. Above the dielectric layer 7, the first silicon layer 6 then comprises polysilicon. In the regions in which the first silicon layer 6 is in direct contact with the monocrystalline silicon substrate layer 8, the first silicon layer 6 then consists monocrystalline silicon. This material can then also be used for forming circuits. A further advantage of this epitaxy process is that the achievable layer thicknesses—in the order of magnitude of 10 to 20 μm—are considerably thicker than when using a process which deposits polysilicon. The most advantageous method is to deposit a structured silicon oxide layer 7 on a monocrystalline silicon substrate 8 and, by means of an epitaxy process, a first silicon layer 6 on the silicon oxide layer 7.

In the epitaxy, a process is used which forms a weakly doped, high-resistance first silicon layer 6. In the polycrystalline region, the weak doping does not lead to an increase in the very low intrinsic conductivity on the basis of charge carrier entry. In order to achieve the situation where the sensor structures are heavily doped and the connecting elements 10 are weakly doped, a diffusion zone 17 is then introduced. For this purpose, a masking layer 15 is applied, underneath which no doping of the silicon layer 6 takes place. Such diffusion processes are known from semiconductor production and may also be concomitantly used for the production of an evaluation circuit.

The further production method is explained using FIG. 3. The first silicon layer 6 is structured by means of a plasma etching process. In this case, the bearing blocks 3, the bearing bars 4, the spring elements 5, the central bar 2, the electrodes 21, 22, 31, 32 and the connecting elements 10 are structured from the first silicon layer 6. The regions of the first silicon layer 6 which are not intended to be structured are protected by a masking layer. The already applied conductor tracks 11 and passivation layers 16 are likewise protected. The conductor tracks 11 are insulated from the silicon layer 6 by a passivation layer 16. The conductor tracks 11 rest directly on the silicon only in the region of the bearing blocks 3 or bearing bars 4. Consequently, contact is made with the sensor only at these points.

In a further etching step, the dielectric layer 7 is then removed underneath the spring elements 5, the central bar 2 and the movable electrodes 21, 22. This can be effected, for example, by exposing the multilayer board to an etching medium after the structuring of the first silicon layer 6, which etching medium etches the dielectric layer 7. On account of the relatively wide dimensions of the bearing blocks 3, the bearing bars 4 and the connecting elements 10, there still remains under these a dielectric layer 7 provided that the etching is interrupted in good time. The spring elements 5, the central bar 2 and the movable and stationary electrodes 21, 22, 31, 32 are, however, dimensioned in such a way in terms of their geometry that at this point in time the dielectric layer 7 under these elements has already been completely removed.

The connecting element 10 is designed as an elongate bar. This measure ensures adequate insulation of the sensor in spite of a certain conductivity of the polysilicon. Since the material for the connecting element 10 is polysilicon, the conductivity of the material is less than that of comparably doped, monocrystalline silicon material. The insulation of the sensor structure towards the substrate layer 8 is ensured by the dielectric layer.

The spring elements 5 are suspended as a folded structure from a central bearing block 3. This arrangement means that the spring elements can expand or contract as desired in the event of a temperature change, without any strain occurring within the spring elements in the process. The temperature dependence of the sensor signal is thus reduced.

The described insulation by means of weakly doped connecting elements 10 is suitable, over and above the application in acceleration sensors, for any type of components in which a heavily doped electrode is formed from a first silicon layer.

The movable electrodes have a first group of movable electrodes 21 and a second group of movable electrodes 22. The stationary electrodes likewise have a first group 31 and a second group 32 of stationary electrodes. The first group of stationary electrodes 31 forms together with the first group of movable electrodes 21 a first group of capacitors 41. The second electrode groups 22, 32 likewise form a second group of capacitors In this case, the individual electrode groups are arranged in such a way that, in the event of an acceleration along the longitudinal axis of the central bar 2, the capacitance of one group of capacitors always increases when the capacitance of the other group decreases. This arrangement as differential capacitors enables nonlinearities in the transfer function to be reduced by regarding the capacitances only differentially. Since conductor track crossovers cannot be produced in the type of contact-making by means of connecting elements 10 shown here, in this case one group of capacitors 41 is arranged on one side of the central bar 2 and the other group of capacitors 42 is arranged on the other side.

What is claimed is:

1. A sensor comprising:
    a first silicon layer;
    a sensor element including at least one electrode structured from the first silicon layer, the electrode having a first doping;
    at least one connecting element structured from the first silicon layer, the connecting element having a second doping less than the first doping; and
    at least one conductor track on the first silicon layer, the conductor track being routed over the connecting element and being electrically coupled to the sensor element for supplying an external signal.

2. The sensor according to claim 1, wherein the at least one electrode includes a movable electrode adapted to be displaced by an acceleration.

3. The sensor according to claim 1, wherein the at least one electrode includes at least one stationary electrode and at least one movable electrode, the stationary electrode and the movable electrode being arranged opposite one another and together forming at least one capacitor.

4. The sensor according to claim 1, wherein:
    the at least one electrode includes first and second stationary electrodes and first and second movable electrodes;
    the first stationary electrode and the first movable electrode form a first capacitor having a first capacitance;
    the second stationary electrode and the second movable electrode form a second capacitor having a second capacitance;

the first capacitance decreases when the second capacitance increases; and the first capacitance increases when the second capacitance decreases.

5. The sensor according to claim 1, wherein:

the at least one electrode includes a plurality of first stationary electrodes, a plurality of second stationary electrodes, a plurality of first movable electrodes arranged opposite to the plurality of first stationary electrodes to form a first group of capacitors having a first capacitance, and a plurality of second movable electrodes arranged opposite to the plurality of second stationary electrodes to form a second group of capacitors having a second capacitance;

the first capacitance decreases when the second capacitance increases; and the first capacitance increases when the second capacitance decreases.

6. The sensor according to claim 1, further comprising a substrate layer arranged beneath the first silicon layer.

7. The sensor according to claim 6, wherein the substrate layer is made of monocrystalline silicon.

8. The sensor according to claim 1, wherein the first silicon layer is constructed of polycrystalline silicon.

9. The sensor according to claim 1, wherein the first silicon layer is constructed partly of polycrystalline silicon and partly of monocrystalline silicon.

10. The sensor according to claim 1, wherein the first silicon layer is constructed of polycrystalline material.

* * * * *

UNITED STATES PATENT AND TRADEMARK OFFICE
CERTIFICATE OF CORRECTION

PATENT NO. : 5,631,422

DATED : May 20, 1997

INVENTOR(S) : Peter Sulzberger; Michael Offenberg; Bernhard Elsneer; Markus Lutz It is certified that error appears in the above-identified patent and that said Letters Patent is hereby corrected as shown below:

Column 4, line 24, "capacitors" should be --capacitors 42.--.

Signed and Sealed this

Twentieth Day of July, 1999

Attest:

Q. TODD DICKINSON

*Attesting Officer*          *Acting Commissioner of Patents and Trademarks*